Aug. 9, 1955        J. J. McGILLIS ET AL        2,714,994
TEMPERATURE CONTROL APPARATUS HAVING A PLURALITY
OF THERMAL RESPONSIVE DEVICES
Filed Aug. 2, 1951                               2 Sheets-Sheet 1
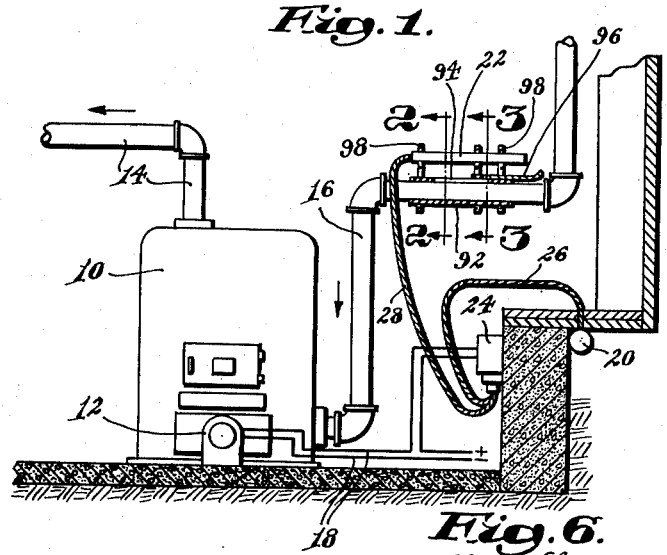
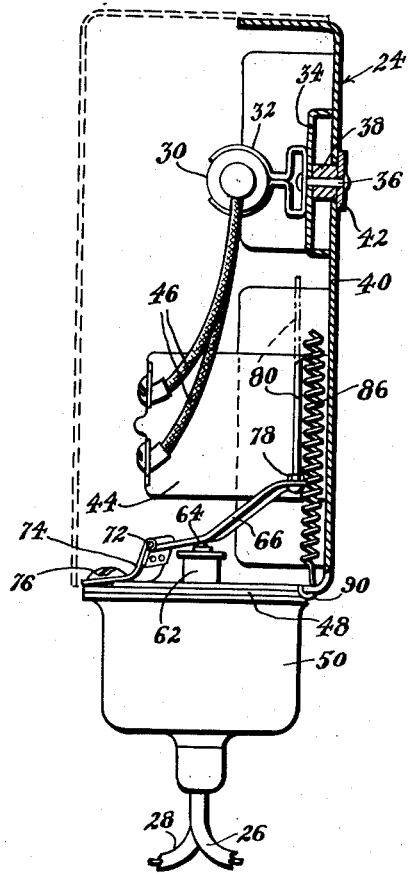
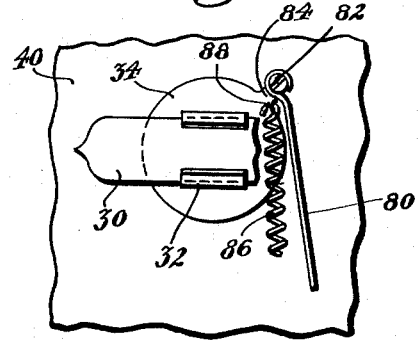
Inventors:
John J. McGillis
Hugh J. McGillis
by John H. McKenna
Attorney Aug. 9, 1955
J. J. McGILLIS ET AL
2,714,994
TEMPERATURE CONTROL APPARATUS HAVING A PLURALITY
OF THERMAL RESPONSIVE DEVICES
Filed Aug. 2, 1951
2 Sheets-Sheet 2
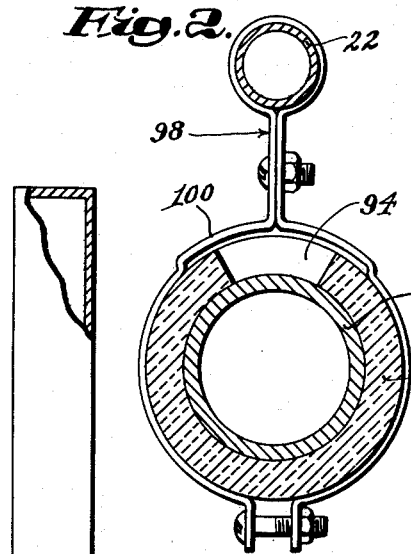
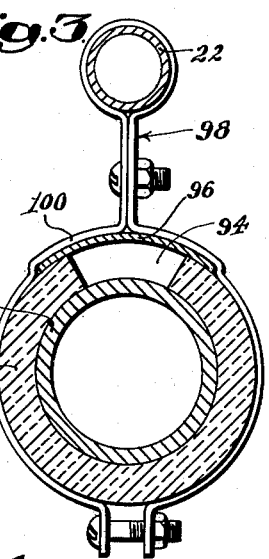
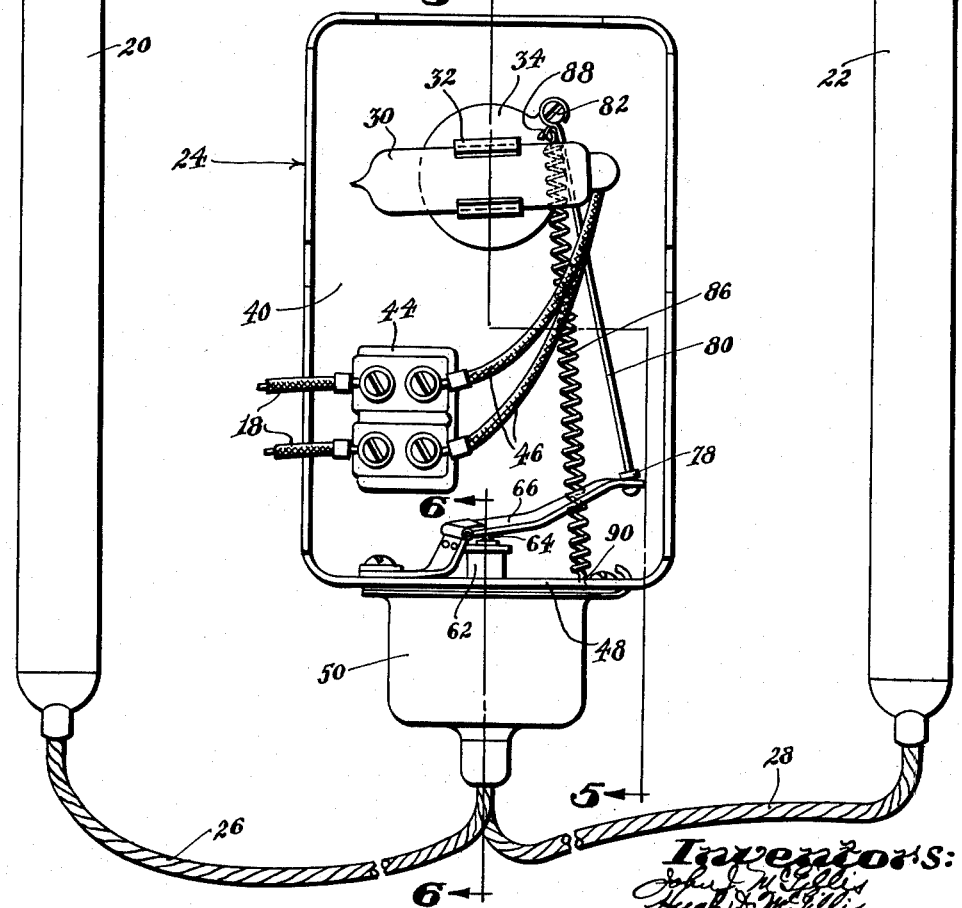
Inventors:
John J. McGillis
Hugh D. McGillis
by John H. McKenna Attorney United States Patent Office 2,714,994
Patented Aug. 9, 1955

2,714,994

TEMPERATURE CONTROL APPARATUS HAVING A PLURALITY OF THERMAL RESPONSIVE DEVICES

John J. McGillis and Hugh D. McGillis, Brockton, Mass.

Application August 2, 1951, Serial No. 239,884

2 Claims. (Cl. 236—91)

This invention relates to improvements in temperature control apparatus of the general type which responds to both inside and outside temperatures in effecting control of the temperature interiorly of buildings. More particularly it provides an improved temperature control apparatus wherein an oil burner, or other heating means, is controlled by inter-action of inside and outside temperature responsive means whose inter-action more effectively accomplishes control of the heating means with a resulting more satisfactory control of the temperature within a building as compared with any prior comparable temperature control apparatus of which we are aware.

In our copending application Serial No. 108,035, filed August 1, 1949, now abandoned, there is disclosed a temperature control mechanism which is generally comparable to the apparatus of the present invention in that a control switch is actuated in response to changes in outside temperature and also is actuated in response to temperature changes of a return pipe of the heating system. The present invention improves upon our said copending disclosure by more effectively coordinating the effects of outside temperature and inside return pipe temperatures to attain greater sensitivity and a generally more satisfactory control of temperature by means of switch actuating means wherein actuating pressure is the result of inter-action of two similar gas filled temperature responsive devices respectively acted upon by outside temperature and the temperature of a return pipe of the building heating system.

It is among the objects of the invention to provide temperature control apparatus wherein a pressure responsive switch-actuating device responds to temperature changes both inside and outside of a building whose temperature is to be controlled and actuates a control switch as a result of pressure in the switch-actuating device which reflects temperature changes at outside and inside temperature responsive devices. According to the invention, generally similar outside and inside gas filled temperature responsive devices are connected together through an intermediate switch-actuating bellows wherein the switch-actuating pressure reflects temperature changes at both of the temperature responsive devices.

Another object of the invention is to provide temperature control apparatus wherein the temperature control is in response to temperature changes at outside and inside inter-acting temperature responsive devices, and wherein the inside temperature responsive device is in heat-receiving relation to a return pipe of the heating system of a building whose interior temperature is being controlled. In a preferred embodiment of the invention, the inside temperature responsive device is in spaced relation to an insulating covering on a return pipe of the heating system, and an opening through the insulating covering, opposite the temperature responsive device, provides for a concentrated transfer of heat through said opening from the return pipe to the temperature responsive device.

Yet another object of the invention is to provide temperature control apparatus wherein a switch-actuating bellows actuates a control switch in response to pressure changes therein produced by inter-action of outside and inside gas filled temperature responsive devices, and wherein there are means for adjustment of the effect any particular pressure developed within the bellows will have on the switch, and for adjustment of the effect the said return pipe, at any particular temperature thereof, will have on the adjacent inside temperature responsive device. Control switch-actuating connections may be adjusted at the bellows to change the position of the switch when any particular pressure prevails in the bellows, and a valve may be opened more or less at the location of the inside temperature responsive device for varying the response of the latter to inside temperature changes.

It is, moreover, our purpose and object generally to improve the structure, sensitivity and operational efficiency of temperature contrtol apparatus and more especially such apparatus which responds to both inside and outside temperatures in controlling the temperature within a building.

In the accompanying drawings:

Fig. 1 is a somewhat diagrammatic representation of a building heating system having associated temperature control apparatus embodying features of the invention, portions of the said apparatus being in medial cross-section;

Fig. 2 is a cross-sectional view on line 2—2 of Fig. 1, on a larger scale;

Fig. 3 is a cross-sectional view on line 3—3 of Fig. 1, on the scale of Fig. 2;

Fig. 4 is an elevational view of the switch box and temperature responsive devices of the temperature control apparatus of Fig. 1, approximately on the scale of Figs. 2 and 3, the cover of the box being removed and portions of the responsive devices and of the conduit connections between the switch box and the temperature responsive devices being broken away;

Fig. 5 is an elevational view partly in cross-section on line 5—5 of Fig. 4;

Fig. 6 is a cross-sectional view on line 6—6 of Fig. 4; and

Fig. 7 is a fragmentary elevational view of the switch-operating connections, a portion of the switch being broken away.

Referring to the drawings, a conventional hot water heating system for a building is represented in Fig. 1, including an oil fired boiler 10 whose oil burner is indicated at 12. Hot water is conducted from the boiler through pipes 14 for distribution to the radiators (not shown) in the various rooms of the building, and the water returns to the boiler through the return pipes 16. It should be understood that the illustrated system is representative of heating systems in general which have means for automatically increasing or decreasing the heating effect of the boiler on a heating medium which circulates through the system and which have at least one conduit through which the heating medium, in liquid or gaseous state, returns to the boiler or to a comparable heating unit.

In the illustrated embodiment of the invention, the oil burner 12, or the like, is electrically driven by current supplied through conductors 18 from any suitable source, being started and stopped in response to predetermined changes of temperature at one of the return pipes 16 or in response to predetermined changes in outside temperature, or a combination of such changes of temperature.

According to the invention, two temperature responsive devices 20, 22 are connected to a common control mechanism, indicated generally at 24, which may be mounted at any desired location in the building whose heating system is to be controlled. Preferably, the control mechanism will be located in the basement at a place where it will not be conspicuous, inasmuch as the control mechanism 24, once having been properly adjusted, should not be tampered with by the tenants or occupants of the building. In other words, the control mechanism 24 initially is adjusted by the heating engineer for year round temperature control and, ordinarily, requires no further attention until worn or broken parts have to be replaced. No thermostats are required in any of the rooms of the building, yet the temperature throughout the building is more satisfactorily and economically controlled automatically by the apparatus of the invention than by any prior comparable temperature control apparatus or system of which we are aware.

In our copending application for patent Serial No. 108,035, filed August 1, 1949, there is disclosed and claimed a somewhat comparable temperature control apparatus wherein outside temperature and the temperature of a return pipe of a heating system both react on a control mechanism for starting and stopping an oil burner, or the like. The present invention improves upon our said copending disclosure in that greater sensitivity is attained and a greater degree of accuracy in the response of the control mechanism to the temperature of the heating medium returning to the boiler, or other heating device.

Preferably, although not necessarily, the two temperature responsive devices 20, 22 may be similar gas-filled tubes or bulbs from one end of each of which a flexible conduit leads to the control mechanism 24, the conduit leading from the temperature responsive device 20 being indicated at 26 and the conduit leading from the temperature responsive device 22 being indicated at 28.

The control mechanism 24 may be a rectangular box having a removable cover which is indicated in dotted lines in Fig. 5. A mercury bulb 30 is mounted in a clamp 32 which is fixed to the front face of a flanged disk 34 by a rivet 36 which also constitutes, with the spacer 38, a pivotal support for the disk 34 on the rear wall 40 of the box. As best seen in Fig. 5, the spacer 38 engages the rear face of disk 34 and is rigidly clamped by rivet 36 between the disk 34 and a washer 42 which engages exteriorly of the rear wall 40 of the box, there being a hole through this rear wall 40 rotatably receiving the spacer 38. Hence, when the disk 34 is rotated, the mercury bulb 30 is rocked about the axis of rivet 36, thereby to cause a body of mercury (not shown) within the bulb to flow to whichever end of the bulb has been lowered. Switch contacts (not shown) within the bulb 30, at its end which is to the right in Fig. 4, are adapted to be bridged by the mercury when the bulb is rocked clockwise from its horizontal position of Fig. 4, thereby to close the circuit to oil burner 12 through the conductors 18, the mercury bulb being in series connection with the oil burner through the medium of terminals on terminal block 44 and bulb conductors 46 within the box 24.

The bottom wall 48 of the box has depending therefrom the hollow relatively large boss 50 whose walls define a chamber 52 within which a pressure-responsive bellows 54, or the like, is mounted, as shown in the cross-sectional view of Fig. 6. Both of the conduits 26, 28, leading from the temperature responsive devices 20, 22, open into the interior of the bellows 54 so that the bellows responds to expansion of the gas in either or both of the temperature responsive devices 20, 22.

The upper side of bellows 54 has a hollow stem 56 rising therefrom within the chamber 52 of boss 50, the lower end of the stem being open into the interior of the bellows and the upper end of the stem being sealed at 58 and exteriorly threaded at 60. A bearing cap 62 is screwed on the threaded upper end of the stem 56 with a conical part 64 of the cap providing a bearing point for a pivoted arm 66. The cap 62 may be adjusted on the stem 56 to set its bearing point at a proper elevation for operative positioning of the pivoted arm 66. A member 68 partially closes the upper end of the chamber 52 of boss 50 and has a central depending cylindrical portion 70 surrounding stem 56 and limiting the permissible expansion of bellows 54.

The pivoted arm 66 is pivoted at 72 on a bracket 74 which may be secured to member 68 in any suitable manner, as by the screw 76. The free end of the pivoted arm 66 has loosely connected to it at 78 the lower end of an actuating rod or link 80 whose upper end is pivotally connected at 82 to a projecting ear 84 on the flanged disk 34. A tensioned coil spring 86 has one end connected at 88 to the disk 34 and has its other end anchored at 90 to the bottom wall or flange of the box 24, with the spring biasing the pivoted arm 66 into contact with the bearing point of conical part 64 of bearing cap 62. Expansion of the gas in either or both of the temperature responsive devices 20, 22 in response to a rise in temperature, elevates the bearing point on bearing cap 62 with a resulting lift of the free end of pivoted arm 66, which in turn produces a counter-clockwise rotation of disk 34 and the carried mercury bulb 30, through the medium of actuating rod or link 80. Contraction of the gas in either or both of the temperature responsive devices 20, 22, in response to a drop in temperature, lowers the bearing point on bearing cap 62 and spring 86 rotates disk 34 clockwise to keep the pivoted lever 66 in contact with the bearing point on the bearing cap 62.

Referring to Fig. 1, the temperature responsive device 20 is shown mounted exteriorly of the building, it preferably being at an inconspicuous and sheltered location where it will be exposed to outside temperature without being unduly affected by direct rays of the sun. The control box and its control mechanism 24 may be mounted interiorly of the basement on any suitable convenient wall or other support, close enough to the exterior location of device 20 so that the flexible conduit 26 will not need to be excessively long.

The temperature responsive device 22 is located adjacent to and generally parallel with a portion of a return pipe 16 of the heating system. A pipe cover 92 of asbestos or other heat insulating material covers the return pipe 16 at least at its region which is opposite the temperature responsive device 22, and a slot 94 is provided in the cover 92 opposite the temperature responsive device 22 so that heat from the covered pipe 16 is directed at and concentrated upon the responsive device 22 by the walls of the slot 94 which, preferably, will have substantial length. However, a slide valve 96 is manually adjustable for covering more or less of the slot 94 to vary the heating effect of return pipe 16 on the responsive device 22.

In the drawings, the responsive device 22 is shown supported above the pipe covering 92 by the strap-metal clamps 98 which extend around the pipe cover 92 and around the responsive device 22, and which are shaped at 100 (Figs. 2, 3) to serve also as guides for the slide valve 96. The clamps 98, or some of them, may be loosened a little when it is desired to adjust the slide valve 96, and the clamps, when tightened, will clamp the slide valve in its adjusted position.

It is a feature of the invention that the mercury bulb switch 30 is sensitively responsive to expansion or contraction of bellows 54, for starting and stopping the oil burner 12, and that both of the temperature responsive devices 20, 22 are in direct communication with the bellows so that the gaseous pressure in the bellows 54 is the direct result of the combined effect of both outside temperature and inside return pipe temperature on the gas within both of the temperature responsive devices 20, 22. Hence, the pressure within the bellows acting to rotate or tilt the bulb switch 30 constantly is a pressure produced by the conjoint action of the outside and the inside temperature responsive devices 20, 22, and it has been found that this resultant bellows pressure more accurately and satisfactorily coordinates outside and inside temperatures in controlling the operation of an oil burner, or comparable heating means, as compared with any comparable temperature control apparatus of which we are aware. The temperature of the covered return pipe 16 is utilized to effect the response of the inside temperature responsive device 22 because this return pipe temperature reflects the temperature conditions throughout the rooms of the building which is being heated and the responsive device 22 responds to this reflected more or less averaged temperature condition rather than to the temperature in any particular room which may be warmer or cooler than some other room or rooms. By covering the return pipe at least at the section thereof with which the responsive device 22 is associated, and by slotting the covering to get a concentrated heat transfer between the return pipe and the responsive device 22, the pressure within the bellows 54, coacting with spring 86, and reflecting also the temperature response of the outside responsive device 20, effectively accomplishes temperature control within the building automatically from one end of the year to another without need for any periodic adjustments once the apparatus has been properly installed and set to suit the heating requirements of any particular building, and without need for any room thermostats or other temperature regulating devices in the rooms of the building.

According to the invention the bellows 54 coacting with spring 86 determines the condition of the bulb switch 30, and both outside temperature and inside return pipe temperature determine the condition of the bellows.

Naturally the special heating problems of each building will require consideration when each control apparatus is being installed and during a test period when the heating engineer will make suitable adjustments of bearing cap 62 and slide valve 96 until a setting is attained which meets the requirements of a particular building, after which further adjustments seldom are necessary. Temperature control installations embodying the invention additionally have substantially reduced fuel and operating costs as compared with any prior temperature control systems of which we are aware.

It is intended that the patent shall cover, by suitable expression in the appended claims, whatever features of patentable novelty exist in the invention disclosed.

We claim as our invention:

1. In a building heating system having heat generating means and distribution conduits for conducting a heating medium within the building, including a return conduit for conducting said medium back to the heat generating means, an insulating covering on said return conduit, a gas-filled thermally responsive device mounted adjacent to said covered return conduit, said covering having an opening therein opposite said device whereby heat from said covered return conduit is released through said opening into heating relation to said device, means for selectively varying the effective size of said opening through said covering thereby to vary the heating effect of said covered return conduit on the adjacent thermally responsive device, a second gas-filled thermally responsive device located exteriorly of said building and responsive to outside temperature, a pressure responsive device connected to both of said thermally responsive devices and responsive to gaseous pressure therein produced by the conjoint response of the two said thermally responsive devices respectively to heat from said return conduit and to outside temperature, mechanism controlling the operation of said heat generating means, and actuating means connecting said pressure responsive device and said controlling mechanism whereby said heat generating means is started and stopped solely in response to pressure changes in said pressure responsive device.

2. In a building heating system having heat generating means and distribution conduits for conducting a heating medium within the building, including a return conduit for conducting said medium back to the heat generating means, an insulating covering on said return conduit, a gas-filled thermally responsive device mounted adjacent to said covered return conduit, said covering having an opening therein opposite said device whereby heat from said covered return conduit is released through said opening into heating relation to said device, a second gas-filled thermally responsive device located exteriorly of said building and responsive to outside temperature, a pressure responsive device connected to both of said thermally responsive devices and responsive to gaseous pressure therein produced by the conjoint response of the two said thermally responsive devices respectively to heat from said return conduit and to outside temperature, mechanism controlling the operation of said heat generating means, actuating means connecting said pressure responsive device and said controlling mechanism whereby the pressure response of said pressure responsive device effects starting and stopping of said heat generating means, and means for adjusting the effective size of said opening in said insulating covering for selectively varying the effect which said pressure responsive device has on said controlling mechanism in response to any particular pressure prevailing in said pressure responsive device.

References Cited in the file of this patent

UNITED STATES PATENTS

| | | |
|---|---|---|
| 1,785,426 | Raymond | Dec. 16, 1930 |
| 1,886,223 | Raymond | Nov. 1, 1932 |
| 2,063,613 | McCarthy | Dec. 8, 1936 |
| 2,067,959 | Wasson | Jan. 19, 1937 |
| 2,211,672 | Reeder | Aug. 13, 1940 |
| 2,268,711 | Lewandowski | Jan. 6, 1942 |